United States Patent [19]

Syfert et al.

[11] Patent Number: 4,748,033

[45] Date of Patent: May 31, 1988

[54] TEA CONCENTRATE HAVING FREEZE THAW STABILITY AND ENHANCED COLD WATER SOLUBILITY

[75] Inventors: Scott W. Syfert, Cincinnati, Ohio; Lora L. Spangler, Myerstown, Pa.; Lowen R. Morrison, Jr., Hamilton, Ohio

[73] Assignee: The Procter & Gamble Company, Cincinnati, Ohio

[21] Appl. No.: 65,086

[22] Filed: Jun. 18, 1987

Related U.S. Application Data

[63] Continuation of Ser. No. 860,601, May 7, 1986, abandoned.

[51] Int. Cl.$^4$ ............................................. A23F 3/16
[52] U.S. Cl. ................................. 426/330.3; 426/597
[58] Field of Search ............................ 426/330.3, 597

[56] References Cited

U.S. PATENT DOCUMENTS

| | | |
|---|---|---|
| 1,525,272 | 2/1925 | Darrah . |
| 2,476,072 | 7/1949 | Tressler . |
| 2,963,368 | 12/1960 | Greenbaum . |
| 2,978,328 | 4/1961 | Melzard et al. . |
| 3,492,126 | 1/1970 | Rubenstein . |
| 3,619,205 | 11/1971 | LeVan et al. . |
| 4,051,267 | 9/1977 | Jongeling . |
| 4,539,216 | 9/1985 | Tse ........................................ 426/597 |

FOREIGN PATENT DOCUMENTS

1319439  6/1973  United Kingdom ................ 426/597

OTHER PUBLICATIONS

Andres, "Xanthan Gums Permit High Clarity Solutions", *Food Processing*, (Nov. 1985), p. 60.
Furia, CRC Handbook of Food Additives, vol. I, (2nd Edition), 1972, pp. 447–448.
Label, Tetley Iced Tea Concentrate, The Coca Cola Company.

*Primary Examiner*—Joseph Golian
*Attorney, Agent, or Firm*—Eric W. Guttag; Ronald L. Hemingway; Richard C. Witte

[57] ABSTRACT

A tea concentrate which is stable against flake formation during cyclic freezing and thawing and which has enhanced solubility in cold water is disclosed. The tea concentrate comprises from about 0.4 to about 8% by weight tea solids, an edible gum selected from xanthan gum, cellulose gums, locust bean gum, guar gum and mixtures thereof in specified amounts, and optionally a solubilizer selected from the sugars, the polyols and mixtures thereof in specified amounts. The tea concentrate has a pH of about 4.6 or less at 20° C. and is therefore stable against the growth of most microbial pathogens without the use of preservatives. Tea beverages prepared from this tea concentrate also have low astringency, fresh brewed tea flavor, and an enhanced mouthfeel.

18 Claims, 2 Drawing Sheets

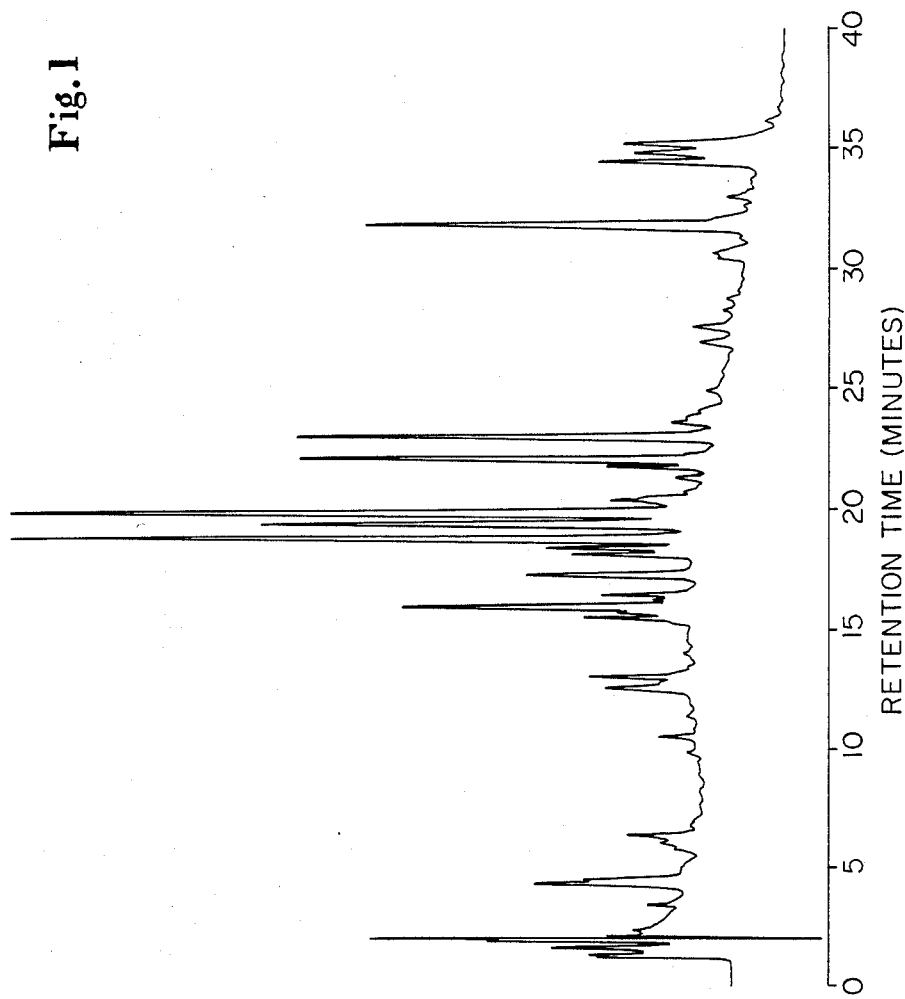

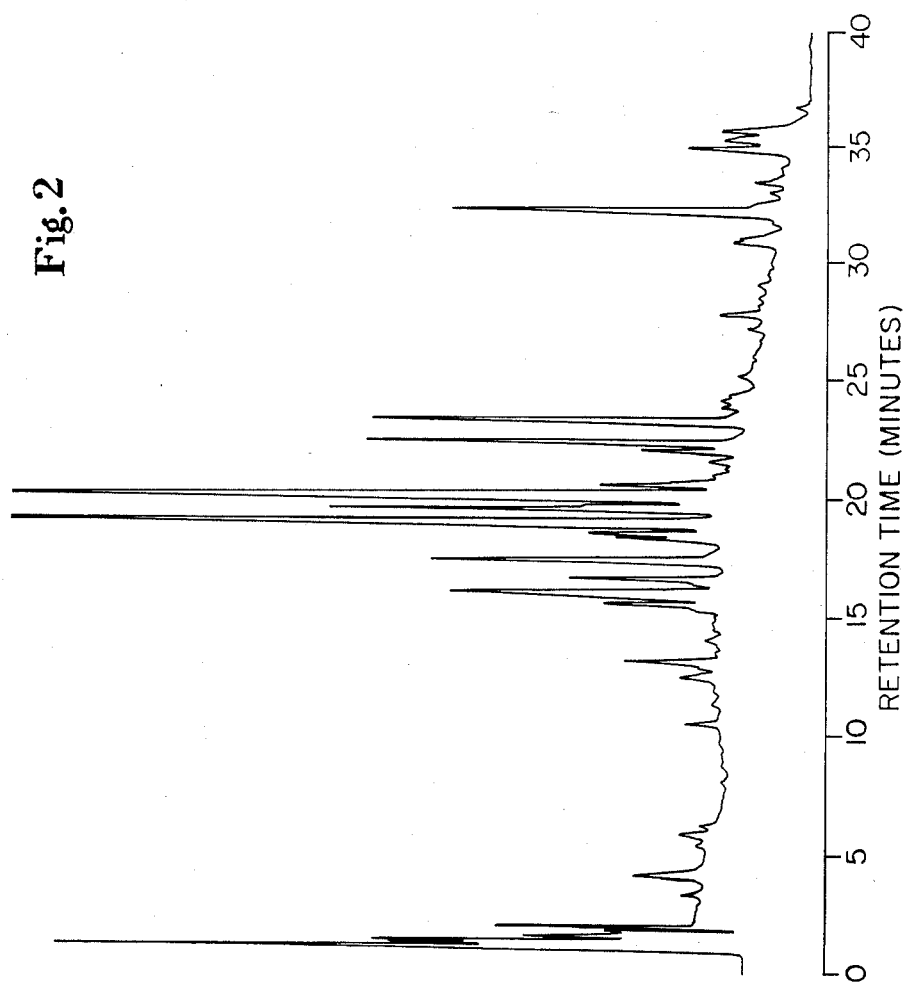

TEA CONCENTRATE HAVING FREEZE THAW STABILITY AND ENHANCED COLD WATER SOLUBILITY

This is a continuation of application Ser. No. 860,601, filed on May 7, 1986, now abandoned.

TECHNICAL FIELD

The present invention relates to tea concentrates having stability against flake formation during cyclic freezing and thawing and enhanced solubility when reconstituted with cold tap water.

Tea creaming occurs during the production of tea extracts in the commercial manufacture of various types of tea products. The cream is a precipitate resulting primarily from the formation of polyphenol-caffeine complexes. Some components of this cream have limited solubility in cold water which causes clouding of tea beverages.

A decreaming step is employed in the manufacture of many tea products to precipitate and remove these complexes. Several decreaming methods are known in the art. These methods include adjustments in operating variables, especially temperature, to cause precipitation of the tea cream complexes, followed by centrifugation, filtration or other equivalent techniques to remove the precipitated complexes.

During manufacture and sale, frozen tea concentrates can also endure cycles of partial thawing and refreezing due to temperature variations in the distribution system, as well as in store and consumer freezers. Even though the majority of tea cream components which cause clouding in cold water are removed during production of the concentrate, additional precipitate can occur due to freeze concentration of the remaining tea solids because of this freeze/thaw cycling. During the "freeze" portion of the cycle, ice crystals form in the tea concentrate. The tea solids are rejected by the ice crystals and are concentrated in the boundary layer between the liquid tea phase and the ice crystals. As the concentration of tea solids in this boundary layer increases, the polyphenols present (e.g. thearubigins and theaflavins) being to interact with themselves and other materials such as caffeine and protein to form larger, heavier complexes which precipitate out as visible flakes when the concentrate is thawed. A tea concentrate containing these insoluble flakes, even when added to hot water, yields a cloudy tea beverage which has visible particles.

Even when distributed frozen, tea concentrates may be subjected to warm or nonrefrigerated temperatures for significant lengths of time before use. Accordingly, the tea concentrate needs to be stable against the growth of most microbial pathogens. Most tea extracts have a pH of about 5.0 or higher. At such pHs, a preservative would have to be added to inhibit microbial growth in case the tea concentrate thawed. Preservatives can impart undesired flavor effects. In the absence of preservatives, the tea concentrate needs to have a pH of about 4.6 or less to be stable against the growth of microbial pathogens when nonfrozen.

Besides freeze/thaw and microbial stability, a frozen tea concentrate should provide a tea beverage which has a relatively low to moderate astringency. Tea tannis (polyphenolic compounds of molecular weight 500 to 3000) are known to interact with salivary proteins in the mouth to form tannin-protein complexes. These complexes can precipitate out and give a puckering mouthfeel referred to as astringency. Some astringency is desirable from a tea beverage. However, excessive astringency and bitterness from a tea beverage can provide an unpleasant mouthfeel.

Tea beverages obtained from a frozen tea concentrate should also have a fresh brewed flavor. The principle polyphenols of fresh brewed tea are the theaflavins and the thearubigins. Theaflavins are believed to contribute to black tea flavor and color. Thearubigins are high molecular weight compounds which also contribute flavor and color. Although theaflavins make significant contributions to the flavor and appearance of a tea beverage, they are almost always present in lower amounts than the thearubigins. However, too high a ratio of thearubigins/theaflavins is indicative of a tea beverage having a flat taste and a dull appearance. Preferred tea concentrates have a thearubigin:theaflavin ratio similar to that of fresh brewed tea.

An enhanced mouthfeel in a tea beverage obtained from a frozen tea concentrate woudl also be desirable. Typical tea beverages have a viscosity of about 1 centipoise or less at 45° F. (7° C.). A higher viscosity tea beverage would provide a much more preferred thicker mouthfeel.

BACKGROUND ART

U.S. Pat. No. 4,051,267 to Jongeling, issued Sept. 27, 1977, discloses that carrageenans are particularly suitable for suspending and stabilizing tannins (polyphenols) in a tea extract which is transported in a frozen or chilled condition for use in vending machines. The pH of the tea extracts used appears to be at least 4.9 based on the Examples. Jongeling also teaches that good suspension and stabilization can be obtained with xanthan gum. However, Jongeling found that even small amounts (less than 1 g. of xanthan gum per 100 ml. of tea extract) increased the viscosity of the tea extract so that the accuracy of dosing in the dispensing machine was impaired.

U.S. Pat. No. 2,963,368 to Greenbaum, issued Dec. 6, 1960, discloses the use of small proportion of a suspending agent, such as cellulose gum, a solubilizer, such as glycerol, or both, in a tea concentrate to prevent precipitation of remaining caffeine and tannin constituents. The tea concentrate is prepared from a tea extract having a total solids content of 11 to 12% and a pH of 4.8 to 5.0. The tea concentrate is preferably raised to a pH of 5.5 by adding sodium bicarbonate and is protected from microbial growth by the inclusion of sodium benzoate.

DISCLOSURE OF THE INVENTION

The present invention relates to a tea concentrate which has a pH of about 4.6 or less at 20° C. This tea concentrate comprises:
  a. from about 0.4 to about 8% by weight tea solids;
  b. an edible gum selected from xanthan gum in an amount of from about 5 to about 12% by weight of the tea solids; natural and modified gums selected from cellulose gum, locust bean gum, guar gum and mixtures thereof in an amount of from about 15 to about 50% by weight of the tea solids; and effective mixtures of up to about 12% by weight of the tea solids of xanthan gum and up to about 50% by weight of the tea solids of said natural and modified gums;
  c. the balance water.

A preferred optional component of the tea concentrate is a solubilizer selected from the sugars, polyols and mixtures thereof in a weight ratio to the tea solids of from about 0.5 to about 5.

Inclusion of the edible gum in the tea concentrates of the present invention makes them stable against flake formation during cyclic freezing and thawing. Inclusion of the gum also gives the resulting tea beverage an increased viscosity and therefore an enhanced mouthfeel. Inclusion of the optional solubilizers make the tea concentrate much more cold water soluble. The tea concentrates of the present invention are also stableagainst the growth of most microbial pathogens without the use of preservatives due to the relatively low pH. These tea concentrates also provide tea beverages having a fresh brewed tea flavor which are relatively low in astringency and are non-bitter.

BRIEF DESCRIPTION OF THE DRAWINGS

FIG. 1 represents an HPLC chromatograph of the polyphenols present in an ice tea beverage prepared from a tea concentrate made according to the present invention.

FIG. 2 represents an HPLC chromatograph of the polyphenols present in an ice tea beverage prepared from a commercial bag tea product.

A. Definitions

As used herein, the term "tea concentrate" refers to a product derived from concentrated tea extract which is diluted with water to form a drinkable tea beverage. Tea concentrates of the present invention comprise from about 0.4 to about 8% tea solids. Preferred tea concentrates of the present invention comprise from about 1 to about 4% by weight tea solids. The tea concentrates of the present invention can be in liquid product form but are preferably in frozen product form.

As used herein, the term "tea beverage" refers to a drinkable beverage prepared from the tea concentrates of the present invention by dilution with water. The tea concentrates of the present invention are generally diluted with from about 1 to about 40 parts water to provide the tea beverage. Preferred tea concentrates are typically diluted with from about 4 to about 20 parts water to provide the tea beverage.

As used herein, the term "tea solids" refer to those solids normally present in a tea extract. Polyphenolic compounds are normally the primary component of tea solids. However, tea solids can also include caffeine, theobromine, proteins, amino acids, minerals and carbohydrates.

As used herein, the term "flakes" refers to insoluble tea solid particles formed at the boundary layer between the liquid tea phase and ice crystals due to freeze concentration of the tea concentrate. These insoluble flakes are extremely difficult to redissolve in cold or hot water without the use of ultrasonic or high shear mixing.

As used herein, the term "comprising" means various components can be conjointly employed in the tea concentrates of the present invention. Accordingly, the term "comprising" encompasses the more restrictive terms "consisting essentially of" and "consisting of".

B. Tea Concentrate

In addition to the tea solids, another key component of the tea concentrates of the present invention are certain edible gums. These edible gums perform at least four functions. The primary function is to prevent the tea polyphenols from forming a concentrated hydrophobic boundary phase between the liquid tea phase and ice crystals during the "freeze" portion of cyclic freezing and thawing of the tea concentrate. This prevents the formation of insoluble flakes that are visible in tea beverages when the tea concentrate is reconstituted with either hot or cold water. The gums also perform a second, related function of solubilizing the tea solids of the concentrate when diluted with water to form the tea beverage.

The other two functions performed by the edible gums are related to mouthfeel effects in the tea beverage. The first is enhancing the mouthfeel of the beverage due to an increased actual viscosity. As previously mentioned, tea beverages typically have a viscosity of about 1 centipoise or less at 45° F. (7° C.). By contrast, tea beverages prepared from tea concentrates of the present invention typically have a viscosity of from about 2 to about 10 centipoise at 45° F. (7° C.). This higher viscosity provides a desirable thicker mouthfeel impression.

The other mouthfeel function is reducing the astringency and perceived bitterness of the tea beverage. The gums are believed to aid in complexing the polyphenolic tannins. These tannins, when uncomplexed, are astringent because they bind salivary proteins. However, once the tannins form soluble complexes with the gum, they are much less likely to bind salivary protein. This reduces the astringency of the tea beverage.

The preferred edible gum for use in the tea concentrates of the present invention is xanthan gum. Xanthan gum is preferred because the resulting tea beverage, at drinking strength, has a relatively high pH (about 5.6) which is considered desirable. When used alone, the amount of xanthan gum present in the tea concentrate is from about 5 to about 12% by weight of the tea solids. At levels much below about 5%, xanthan gum alone is not very effective in preventing flake formation during freeze/thaw cycling of the tea concentrate. At levels much above about 12%, the resulting tea beverage has too high a viscosity. Preferably, the amount of xanthan gum included is from about 6 to about 10% by weight of the tea solids.

Other modified and natural gums which are useful in the tea concentrates of the present invention are the cellulose gums, locust bean gum, guar gum and mixtures thereof. Suitable cellulose gums include methylcellulose, hydroxypropylmethylcellulose, carboxymethylcellulose, hydroxypropylcellulose, hydroxyethylcellulose, ethylhydroxyethylcellulose, and mixtures thereof. The preferred cellulose gum is carboxymethylcellulose. These other gums provide tea concentrates which yield tea beverages having a lower pH at drinking strength than those where xanthan gum is used. For example, carboxymethylcellulose provides tea beverages having a pH of about 5.

When used alone, these other gums (or mixtures thereof) are included in the tea concentrae in an amount of from about 15 to about 50% by weight of the tea solids. At levels much below about 15%, these other gums alone are not very effective in preventing flake formation during freeze/thaw cycling of the tea concentrate. At levels much above about 50%, the resulting tea beverage has too high a viscosity. Preferably, these other gums are included in an amount of from about 20 to about 40% by weight of the tea solids.

Effective mixtures of xanthan gum with these other natural and modified gums can also be used in tea concentrates of the present invention. As used herein, the term "effective mixture" includes mixtures where xanthan gum is present in an effective amount (from about 5 to about 12% by weight of the tea solids); mixtures where the other modified and natural gums are present in an effective amount (from about 15 to about 50% by weight of the tea solids); mixtures where both the xanthan gum and other gums are present in an effective amount; as well as mixtures of xanthan gum and other gums where neither alone is present in an effective amount but which together provide an effective amount of the edible gum for the purpose of inhibiting formation of insoluble flakes during freeze/thaw cycling of the tea concentrate. For example, a mixture of about 4% xanthan gum and about 14% carboxymethylcellulose by weight of the tea solids is an effective mixture within the meaning of the present invention. Typically, these mixtures comprise xanthan gum in an amount of from about 2 to about 5% by weight of the tea solids, and the other gums in an amount of from about 5 to about 25% by weight of the tea solids.

A preferred optional component included in the tea concentrates of the present invention is a solubilizer. The solubilizer helps to keep the tea solids dissolved in the liquid tea phase to prevent the formation of cream and other precipitates. Inclusion of solubilizers is particularly important if the tea concentrate is to have cold water solubility. As used herein, the term "cold water solubility" refers to a tea concentrate which is substantially soluble in water having a temperature of about 20° C. or less. Tea concentrates which contain a solubilizer provide tea beverages having a turbidity of less than about 50 nephelometrics turbidity units (herein NTU). By comparison, tea concentrates of the present invention which do not contain a solubilizer typically provide tea beverages having turbidity values of from about 50 to about 100 NTU. (Turbidity values for the tea beverages resulting from these tea concentrates are measured by the analytical method described hereafter.)

Solubilizers useful in the tea concentrates of the present invention are selected from sugars, polyols and mixtures thereof. Suitable sugars include fructose, glucose, maltose, corn syrups (high fructose corn syrups and high maltose corn syrups), invert sugar, maltodextrins, polydextrose, cyclodextrins and mixtures thereof. Preferred sugars for use in the present invention are the high fructose corn syrups and the maltodextrins. Suitable polyols for use in tea concentrates of the present include glycerol, propylene glycol, the sugar alcohols such as sorbitol, mannitol, maltol and xylitol, and the polyglycerols such as triglycerol, hexaglycerol, and decaglycerol. The preferred polyol for use in the tea concentrates of the present invention is glycerol.

The solubilizers are included in the tea concentrates of the present invention in a weight ratio to the tea solids of from about 0.5 to about 5. The particular amount included will depend upon the solubilizer chosen and the effects desired. For example, high fructose corn syrups are preferably included in a weight ratio to tea solids of from about 0.5 to about 2. Another preferred sugar solubilizer, maltodextrin, is preferably included in a weight ratio to tea solids of from about 0.5 to about 4. The preferred polyol solubilizer, glycerol, is preferably included in the tea concentrates of the present invention in a weight ratio to tea solids of from about 0.5 to about 2. Care should also be taken to make sure that the solubilizer is not included at a high enough level to cause an off-flavor.

Certain combinations of edible gums with the solubilizers are especially preferred for use in the tea concentrates of the present invention. These preferred combinations include xanthan gum with high fructose corn syrup; xanthan gum with maltodextrin; xanthan gum with a mixture of high fructose corn syrup and maltodextrin; carboxymethylcellulose with maltodextrin; carboxymethylcellulose with high fructose corn syrup; carboxymethylcellulose with a mixture of maltodextrin and high fructose corn syrup; and a mixture of xanthan gum and carboxymethylcellulose with a mixture of high fructose corn syrup and maltodextrin. These preferred combinations can also contain glycerol.

The tea concentrates of the present invention have a pH of about 4.6 or less at 20° C., i.e. room temperature. As such, they are essentially stable against the growth of most pathogenic bacteria without the use of preservatives. Typically, the pH of the tea concentrates of the present invention is from about 2.5 to about 4.6 at 20° C. Generally, tea extracts used in the preparation of the tea concentrates of the present invention have a pH above 4.6, and typically about 5.0. To acidify the tea extract for use in the tea concentrates of the present invention a sutable edible acid can be added in an amount appropriate to lower the pH to about 4.6 or less. Suitable edible acids include fumaric acid, citric acid, adipic acid, tartaric acid, succinic acid, malic acid, hydrochloric acid, carbonic acid, ascorbic acid, phosphoric acid, as well as mixtures of these acids (e.g. ascorbic acid and phosphoric acid). Malic acid, and especially phosphoric acid, are preferred for use in the tea concentrates of the present invention since they provide a tea beverage having a much higher pH when diluted to drinking strength. The tea concentrate can also be acidified by contact with an appropriate ion exchange resin. Examples of suitable ion exchange resins include Dowex HCR-S ®, available from Dow Chemical Co. of Midland, MI, and Rohm & Haas IRC-50 ® acid cationic exchange resin available from Rohm & Haas of Philadelphia, PA. Acidification with ion exchange resins is a particularly useful method since the tea concentrate will provide a tea beverage having a much higher pH at drinking strength.

A particularly important property of the tea concentrates of the present invention is the fact that they provide tea beverages having a polyphenolic profile similar to that of fresh brewed tea. As previously mentioned, the principle polyphenols in tea are the theaflavins and the thearubigins. One adverse effect of the formation of insoluble flakes during freeze/thaw cycles is that the ratio of thearubigins to theaflavins increases with each cycle because the theaflavins are preferentially involved in flake formation. Thus, by preventing flake formation, the tea concentrates of the present invention maintain a theaflavin content similar to that of fresh brewed tea. The tea concentrates of the present invention have a thearubigin to theaflavin ratio of from about 4 to about 8. By comparison, standard fresh brewed teas have a ratio from about 3 to about 10. This ratio is based on the polyphenolic profile of the tea concentrate (or resulting tea beverage) obtained by high pressure liquid chromatography (HPLC) according to a method described hereafter.

The similarity in flavor profile between the tea concentrates of the present invention and freshly brewed tea is illustrated by a comparison of the HPLC chromatographs of FIGS. 1 and 2 and especially the thearubigin to theaflavin ratios defined by these chromatographs. FIG. 1 represents the HPLC chromatograph of a drinking strength iced tea beverage prepared from a tea concentrate made similar to Embodiment 1 of the present invention. The retention time (minutes) and area under the curve for each peak of this chromatograph are as follows:

| Retention Time | Area |
| --- | --- |
| 1.07 | 6507 |
| 1.24 | 1647 |
| 1.36 | 2633 |
| 1.65 | 829 |
| 2.04 | 1650 |
| 3.51 | 164 |
| 4.27 | 1190 |
| 6.08 | 333 |
| 6.49 | 131 |
| 10.87 | 382 |
| 12.87 | 624 |
| 13.28 | 184 |
| 13.49 | 1237 |
| 13.97 | 54 |
| 14.52 | 255 |
| 15.24 | 44 |
| 16.00 | 1569 |
| 16.49 | 4029 |
| 17.10 | 2300 |
| 17.90 | 4110 |
| 18.88 | 1299 |
| 19.09 | 1723 |
| 19.48 | 10485 |
| 20.10 | 6165 |
| 20.62 | 11152 |
| 21.18 | 2623 |
| 21.67 | 368 |
| 21.98 | 258 |
| 22.31 | 549 |
| 22.77 | 1246 |
| 23.09 | 4607 |
| 24.08 | 4902 |
| 24.76 | 414 |
| 25.06 | 569 |
| 25.30 | 330 |
| 26.14 | 315 |
| 28.30 | 346 |
| 28.92 | 697 |
| 29.29 | 190 |
| 29.71 | 249 |
| 30.27 | 274 |
| 30.74 | 115 |
| 31.14 | 120 |
| 32.05 | 573 |
| 32.21 | 618 |
| 33.34 | 5542 |
| 34.32 | 218 |
| 34.71 | 606 |
| 35.41 | 86 |
| 36.12 | 1894 |
| 36.57 | 1625 |
| 36.98 | 1760 |
| 38.08 | 143 |
| 38.63 | 46 |
| 40.19 | 93 |
| 42.36 | 42 |

The peaks at retention times 16.00 through 24.08 minutes are believed to represent the thearubigins and provide a total area of 57,385. The peaks at retention times 33.34 through 36.98 minutes are believed to represent the theaflavins and provide a total area of 11,731. The ratio of these total areas is 4.89.

FIG. 2 represents an HPLC chromatograph of an ice tea beverage freshly prepared from a commercial bag tea product. The retention times and area under the curve for each peak are as follows:

| Retention Time | Area |
| --- | --- |
| 1.37 | 656 |
| 1.66 | 684 |
| 2.03 | 3267 |
| 2.45 | 2912 |
| 3.62 | 199 |
| 4.52 | 2919 |
| 6.12 | 82 |
| 6.37 | 339 |
| 6.67 | 843 |
| 7.18 | 63 |
| 8.63 | 76 |
| 9.93 | 45 |
| 10.31 | 128 |
| 11.00 | 382 |
| 11.89 | 133 |
| 13.09 | 1783 |
| 13.35 | 370 |
| 13.58 | 1345 |
| 14.08 | 81 |
| 14.62 | 214 |
| 15.08 | 272 |
| 16.14 | 1694 |
| 16.61 | 4513 |
| 16.93 | 453 |
| 17.19 | 1631 |
| 17.98 | 2569 |
| 18.93 | 1682 |
| 19.18 | 1967 |
| 19.56 | 11491 |
| 20.20 | 6932 |
| 20.70 | 13261 |
| 21.25 | 1531 |
| 21.44 | 984 |
| 21.77 | 726 |
| 22.37 | 645 |
| 22.82 | 1399 |
| 23.12 | 5143 |
| 24.09 | 5622 |
| 24.79 | 787 |
| 25.01 | 616 |
| 25.30 | 400 |
| 26.15 | 638 |
| 27.00 | 133 |
| 28.26 | 603 |
| 28.90 | 932 |
| 29.69 | 381 |
| 30.19 | 189 |
| 30.65 | 76 |
| 32.07 | 1148 |
| 32.83 | 165 |
| 33.24 | 6821 |
| 34.15 | 274 |
| 34.54 | 773 |
| 35.27 | 441 |
| 35.96 | 3133 |
| 36.41 | 2805 |
| 36.79 | 3623 |
| 37.90 | 208 |
| 38.50 | 49 |
| 39.20 | 46 |
| 40.02 | 50 |

The peaks at retention times 16.14 through 24.09 minutes are believed to represent the thearubigins and provide a total area of 62,243. The peaks at retention times 33.24 through 36.79 minutes are believed to represent the theaflavins and provide a total area of 17,870. The ratio of these total areas is 3.48.

Suitable optional ingredients for use in the tea concentrates of the present invention are chelating agents such as ethylenediaminetetraacetic acid (EDTA) or polyphosphates such as sodium metaphosphate, sodium pyrophosphate, tetrasodium pyrophosphate, sodium tripolyphosphate, potassium tripolyphosphate, tetrapotassium polyphosphate, tetrasodiummonopotassium tripolyphosphate, and hexaphos (sodium hexametaphosphate). Inclusion of these agents aids in maintaining tea beverage clarity in hard water. Very low levels of preservatives such as the benzoates and sorbates can also be included to inhibit mold growth. However, tea concentrates of the present invention are typically substantially free of such preservatives.

Generally, the tea concentrates of the present invention can be sweetened or unsweetened. The use of the edible gums according to the present invention is particularly useful in preparing diet tea concentrates which contain a sweetening amount of a noncaloric sweetener such as saccharin, cyclamates, acetosulfam, L-aspartyl-L-phenylalanine lower alkyl ester sweeteners (e.g. aspartame), L-aspartyl-D-alanine amides disclosed in U.S. Pat. No. 4,411,925 to Brennan et al., issued Oct. 23, 1983 (herein incorporated by reference), L-aspartyl-D-serine amides disclosed in U.S. Pat. No. 4,399,163 to Brennan et al., issued Aug. 16, 1983 (herein incorporated by reference), L-aspartyl-L-1-hydroxymethylalkaneamide sweeteners disclosed in U.S. Pat. No. 4,338,346 to Brand, issued Dec. 21, 1982 (herein incorporated by reference), L-aspartyl-1-hydroxyethylalkaneamide sweeteners disclosed in U.S. Pat. No. 4,423,029 to Rizzi, issued Dec. 27, 1983 (herein incorporated by reference), L-aspartyl-D-phenylglycine ester and amide sweeteners disclosed in European Patent Application No. 168,112 to J. M. Janusz, published Jan. 15, 1986 (herein incorporated by reference) and the like. A particularly preferred noncaloric sweetener for use in such diet tea concentrates is aspartame.

The tea concentrate of the present invention can also be flavored with various natural or synthetic flavors. Natural and synthetic coloring agents can also be included. Particularly preferred are lemon flavoring (e.g. lemon oil) and caramel coloring. These flavoring and coloring agents are included in the tea concentrates in amounts well known to those skilled in the tea art.

Method for Preparing Tea Concentrates

The tea extracts used in preparing the tea concentrates of the present invention can be obtained from fermented and unfermented teas, e.g., black tea, oolong tea, green tea, or mixtures thereof. Typically, the tea extract is obtained from about 85 to 100% black tea leaves and from 0 to about 15% green tea leaves. When black tea is used in preparing the tea extract, it can be enzymatically pretreated according to the method described in European Patent Application No. 135,222 to C. H. Tsai, published May 27, 1985, which is incorporated by reference. In the Tsai method, black tea leaves are wetted with water containing tannase and one or more cell-wall-digesting enzymes, such as cellulase, pectinase, or hemicellulase prior to extraction. The enzyme-moistened tea leaves are incubated in a closed system at room temperature for a few hours, neutralized with a suitable foodgrade base and then heated to inactivate the enzymes. The resulting enzyme-treated tea leaves provide a higher yield of tea extract which has better solubility in cold water.

The tea leaves, with or without pretreatment with enzymes, can then be extracted in a conventional manner to provide the tea extract. See Pintauro, *Tea and Soluble Tea Products Manufacture* (1977), pp. 39–81 (herein incorporated by reference), for various methods of obtaining tea extract from tea leaves. The tea leaves are typically slurried with water followed by separation of the leaves from the resulting tea extract. This extraction can be performed in a single batch fashion, as a continuous process, as a countercurrent multiple vessel process, or any combination thereof. Continuous countercurrent tea extraction is the most preferred method. If desired, tea aroma and flavor components can be volatilized from the extract, collected, condensed and added back at a later point in the process. Also, the tea desorbate process disclosed in U.S. Pat. No. 4,220,673 to Strobel, issued Sept. 2, 1980 (herein incorporated by reference), can be used to provide the tea extract. A tea extraction process which avoids harsh tea flavors and preserves real tea flavor is desirable.

The tea extract resulting from slurry or countercurrent extraction of tea leaves produces a turbid beverage when diluted with cold water. Typically, the tea extract is cooled to separate solids which form in a decreaming step. Solids which are precipitated by cooling consist chiefly of tea creams resulting from the formation of complexes of polyphenolic compounds and caffeine. Removal of tea creams is typically achieved by centrifugation, filtration or other suitable means. Depending upon the desired concentration of tea solids in the product, the clarified extract can be further concentrated by suitable methods such as evaporation or reverse osmosis. See Pintauro, supra, pp. 82–141 (herein incorporated by reference), for various representation methods for decreaming, filtering and concentrating tea extracts.

The edible gums, solubilizers and other optional ingredients can be added at various points in this process. For example, some or all of these product additives can be added to the tea extraction water prior to contact with the tea leaves. In particular, the addition of solubilizers to the water used in tea extraction aids in the extraction of theaflavins and other tea components. Also, the previously described chelating agents such as EDTA and the polyphosphates can be added to the extraction water to sequester undesired minerals such as calcium and magnesium typically present in hard water and tea leaves. The product additives, especially the edible gums and solubilizers, can also be added later in this process, such as before or after decreaming and clarification of the tea extract.

The tea extract, after appropriate processing to provide the desired level of tea solids and after the edible gums, solubilizers and optional ingredients have been added, forms the tea concentrate of the present invention. This tea concentrate is preferably pasteurized or sterilized prior to packing in containers. The tea concentrate product can be distributed as a liquid tea concentrate or else can be chilled to provide a frozen tea concentrate product.

D. Analytical Methods

The following analytical methods are used in the present application to evaluate the polyphenolic profile and turbidity properties of tea concentrates or tea beverages.

1. Polyphenols

The polyphenols present in the tea concentrates or tea beverages are analyzed using a modification of the high pressure liquid chromatography procedure described by Hoefler and Coggon, *Journal of Chromatography*, Vol. 129, (1976), pp. 460–63.

A DuPont model 8800 liquid chromatographic system (manufactured by DuPont Company, Analytical Instrument Division, Wilmington, DE 19898) with a variable wavelength ultraviolet spectrophotometric detector set at 380 nm is used. Samples are injected onto a chromatographic column using a Dynatech Precision Sampling model LC-241 autosampler (available from Dynotech Precision Sampling, Baton Rouge, LA 70895). A high pressure liquid chromatographic column, Supelco LC-18 3 um ODS, 15 cm×4.6 mm (available from Supelco Inc., Bellefonte, PA 16823) is used. Chromatographic peaks are recorded using a Spectra-Physics model 4290 recording integrator (available from Spectra-Physics, 3333 N. First St., San Jose, CA 95134). Peak integration is accomplished using a Hewlett-Packard model 1000 computer (available from Hewlett-Packard, 1820 Embarcadero Rd., Palo Alto, CA 94303).

A binary mobile phase system is used. Mobile phase A consists of 0.24% glacial acetic acid in Milli-Q water (water purified in a Milli-Q Purification Unit, available from Millipore Corp. of Bedford, MA 01730). Mobile phase B consists of 50% of 0.24% glacial acetic acid in Milli-Q water and 50% acetone (HPLC grade), available from Burdick & Jackson, 1953 S. Harvey St., Muskegon, MI 49442.

Samples are eluted in four timed solvent segments: (1) an isocratic segment of 80% mobile phase A and 20% mobile phase B for 2 minutes; (2) a linear gradient from 75% mobile phase A: 25% mobile phase B to 25% mobile phase A: 75% mobile phase B in 30 minutes; (3) an isocratic segment of 10% mobile phase A and 90% mobile phase B for 8 minutes; and (4) an isocratic segment of 80% mobile phase A and 20% mobile phase B for 1 minute.

Tea solutions containing no carbohydrate additives are first made to drinking strength. An approximate volume of 2 ml is filtered through a 0.45 um cellulose-acetate disposable filter, Millex HA, 25 mm diameter, available from Millipore Corp., Bedford, MA 01730. A 50 ul injection of the filtered solution is made.

Tea solutions containing carbohydrate additives are sequentially diluted with acetone and water to precipitate the carbohydrates insoluble in mobile phase B. For example, the tea concentrate of the present invention is diluted as follows: (1) 1 ml tea concentrate is diluted with 2 ml acetone (source as above); (2) precipitated carbohydrate material is removed with a pasteur pipet; (3) 1 ml of the resultant solution is further diluted with 1.67 ml Milli-Q water; (4) 1 ml of the resulting solution is further diluted with 1 ml Milli-Q water to make a drinking strength solution. Approximately 2 ml of this solution is filtered through a 0.45 um filter, described above, and 50 ul is injected onto the chromatographic column.

2. Turbidity

The nephelometric method and nephelometric turbidity unit, as described in "Standard Methods for the Examination of Water and Waste Water", 14th ed., published by American Public Health Association, Washington, D.C., is used to determine the cloudiness or turbidity of the tea beverages. A Hach Ratio Turbidimeter, Model 18900-00, available from Hach Chemical Company, Loveland, Col., is employed. It is calibrated prior to each measurement using Latex Standard solutions provided by Hach Chemical Company. For refrigerated beverages, the turbidity is measured at the refrigerated temperature, i.e. 45° F. (7° C.).

E. Specific Embodiments of Tea Concentrates of Present Invention

The following specific embodiments are used to illustrate the tea concentrates of the present invention:

Embodiment 1

A blend of 90% black tea leaves (Tender Leaf® blend) and 10% Taiwanese green tea fannings was fed to a Niro® countercurrent extractor (Model A27) at a rate of 0.33 lbs./min. (0.15 kg/min.). Distilled water was treated with 0.02% sodium hexametaphosphate and fed into the extractor at a flow rate and temperature of 3.5 lbs./min. (1.6 kg/min.) and 180° F. (82.2° C.), respectively. The extract was cooled to a temperature of 124° F. (51.1° C.) at the discharge port of the extractor. The extract was passed through a No. 200 (A.S.T.M. Standard) filter screen. This extract had a tea solids concentration of 4.65%.

The extract was cooled to 85° F. (29.4° C.) and fed to a continuous centrifuge (West Falia Separator Type SA-14-47-076) after a 30 minute hold time at 85° F. (29.4° C.). The centrifuge was operated at 7560 rpm. After clarification, the tea solids concentration was 4.15%. The extract was diluted with distilled water to a concentration of 3.7% tea solids.

To 100 lbs. (45.4 kg) of this tea extract was added and mixed 0.27 lbs. (276 grams) Keltrol-T® foodgrade xanthan gum and 2.5 lbs. (1.1 kg) of maltodextrin using a continuous blender (Ladish Co. Triblender, Model No. F2116 MD-S). Then, 4.0 lbs. (1.8 kg) of high fructose corn syrup-55, 0.49 lb. (222 grams) caramel color, and 0.0043 lbs. (1.95 grams) of FD&C Red Dye #40 were added and mixed in. The pH of the mixture was adjusted to 4.5 using 0.08 lbs. (36.3 grams) of foodgrade 75% phosphoric acid. The tea concentrate was then packed into 4 oz. cans after pasteurizing in a Crepaco UHT unit. The cans were then frozen at −10° F. (−23.3° C.).

The frozen concentrate obtained had 3% tea solids, 7% (tea solids basis) of xanthan gum, 107% (tea solids basis) of high fructose corn syrup and 66% (tea solids basis) of maltodextrin. One part of the tea concentrate diluted with 15 parts water provided a tea beverage having a turbidity value of 15 NTU and a viscosity of 2.7 centipoise at 45° F. (7° C.).

Embodiments 2 to 7

Six hundred and fifty (650) pounds (295.5 kg.) of distilled deaerated water at 70° F. (20° C.) is placed in a stainless steel tank. Thirty-two and one-half (32.5) pounds (14.8 kg.) of black tea leaves (Tender Leaf® blend) are mixed into the water. After constant agitation for 20 minutes, the slurry is allowed to settle for 20 minutes. The mixture is maintained at about 70° F. (21° C.) during this time.

Five hundred (500) pounds (227.3 kg.) of the 70° F. (21° C.) extract are then removed from the leaves by pumping the extract through a No. 200 (A.S.T.M. Standard filter screen. Five hundred (500) pounds (227.3 kg.) of water are added to the residual leaves. This mixture is heated to 180° F. (82° C.) while under constant agitation. Five hundred (500) pounds (227.3 kg.) of tea extract is recovered from the heating tank by deleafing using a West Falia Separator (Type CA 220-010). The deleafed tea extract is mixed with the 70° F. extract, then cooled to 45° F. (7° C.). The chilled solution is centrifuged with a West Falia Separator (Type SA 14-47-076) at 7560 rpm. The clarified extract is concentrated by means of reverse osmosis using D.D.S. HR-98 membranes. To this concentrated extract is added various quantities of xanthan gum (XG), carboxymethyl cellulose (CMC), maltodextrin (MD), high fructose corn syrup-55 (HFCS) and glycerol (GLYC), as shown in the following Table:

| Embodiment | % Tea Solids | % XG* | % CMC* | % MD* | % HFCS* | % GLYC* |
|---|---|---|---|---|---|---|
| 2 | 0.8 | — | 18.8 | 250 | | 62.5 |
| 3 | 0.8 | — | 25 | 312.5 | | 81.3 |
| 4 | 0.8 | 6.3 | — | — | | 100 |
| 5 | 1.07 | — | 28 | 280.3 | | 56.1 |
| 6 | 1.0 | — | 38 | 250 | — | 60 |
| 7 | 1.0 | 0.4 | 23 | 250 | 60 | — |

The tea concentrates (Embodiments 2 to 7 above) are acidified to pH 4.5 with foodgrade 75% phosphoric acid and then packed into 12 oz. cans after pasteurizing in a Crepaco UHT unit and frozen at 0° F. (−18° C.).

What is claimed is:

1. A frozen tea concentrate having a pH of about 4.6 or less at 20° C. and which comprises:
    a. from about 0.4 to about 8% by weight decreamed tea solids;
    b. an edible gum selected from the group consisting of xanthan gum in an amount of from about 5 to about 12% by weight of said tea solids; natural and modified gums selected from the group consisting of cellulose gums, locust bean gum, guar gum and mixtures thereof in an amount of from about 15 to about 50% by weight of said tea solids; and mixtures of from about 2 to about 5% by weight of said tea solids of said xanthan gum and from about 5 to about 25% by weight of said tea solids of said natural and modified gums;
    c. the balance water.

2. The tea concentrate of claim 1 wherein said cellulose gum is carboxymethylcellulose.

3. The tea concentrate of claim 2 wherein said edible gum is carboxymethylcellulose.

4. The tea concentrate of claim 2 wherein said edible gum is xanthan gum.

5. The tea concentrate of claim 1 which further comprises a solubilizer selected from the group consisting of sugars, polyols and mixtures thereof in a weight ratio to said tea solids of from about 0.5 to about 5.

6. The tea concentrate of claim 5 wherein said sugars are selected from the group consisting of glucose, fructose, corn syrups, maltose, maltodextrins, polydextroses and cyclodextrins and wherein said polyols are selected from the group consisting of glycerol, sugar alcohols and polyglycerols.

7. The tea concentrate of claim 6 wherein said solubilizer is selected from the group consisting of high fructose corn syrup, maltodextrins, glycerol and mixtures thereof.

8. The tea concentrate of claim 1 which comprises from about 1 to about 4% by weight of said tea solids.

9. The tea concentrate of claim 1 which further comprises a sweetening amount of a noncaloric sweetener.

10. The tea concentrate of claim 9 wherein said noncaloric sweetener is aspartame.

11. The tea concentrate of claim 1 which is frozen.

12. The tea concentrate of claim 1 which further comprises an edible acid selected from the group consisting of phosphoric acid and malic acid.

13. The tea concentrate of claim 12 wherein said edible acid is phosphoric acid.

14. A frozen tea concentrate having a pH of about 4.6 or less at 20° C. and which comprises:
    a. from about 1 to about 4% by weight decreamed tea solids;
    b. from about 6 to about 10% by weight of said tea solids of xanthan gum;
    c. a solubilizer selected from the group consisting of high fructose corn syrup, maltodextrins, glycerol and mixtures thereof in a weight ratio to said tea solids of from about 0.5 to about 5;
    d. the balance water.

15. The tea concentrate of claim 14 which further comprises a sweetening amount of aspartame.

16. The tea concentrate of claim 14 which is frozen.

17. The tea concentrate of claim 14 which further comprises a lemon flavoring.

18. The tea concentrate of claim 1 which has a thearubigin to theaflavin ratio of from about 4 to about 8.

* * * * *